Nov. 29, 1960 — R. M. MULLER — 2,961,924
LENS TESTING INSTRUMENT
Filed April 23, 1957 — 2 Sheets-Sheet 1

INVENTOR
ROBERT M. MULLER
BY Herbert C. Kimball
ATTORNEY

Nov. 29, 1960 R. M. MULLER 2,961,924
LENS TESTING INSTRUMENT
Filed April 23, 1957 2 Sheets-Sheet 2
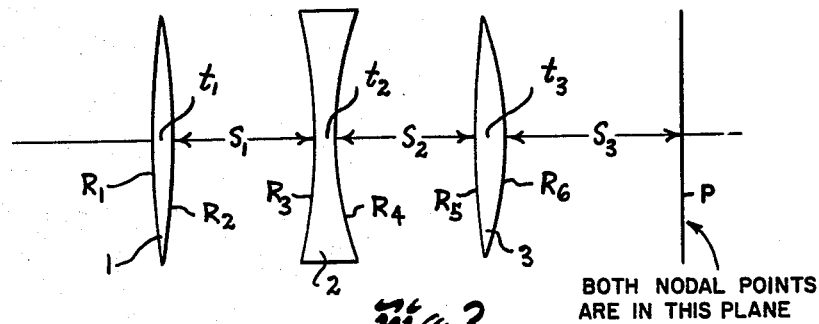
*Fig. 3*
| LENS | N | V | RADII | THICKNESSES |
|---|---|---|---|---|
| 1 | 1.7506 | 27.7 | $R_1 = +\ .5816\ F$ | $t_1 = .01108\ F$ |
| | | | $R_2 = -\ 1.73609\ F$ | $S_1 = .09144\ F$ |
| 2 | 1.7506 | 27.7 | $R_3 = -\ .33223\ F$ | $t_2 = .01134\ F$ |
| | | | $R_4 = +\ .22783\ F$ | $S_2 = .08966\ F$ |
| 3 | 1.5704 | 48.1 | $R_5 = +\ .56001\ F$ | $t_3 = .01693\ F$ |
| | | | $R_6 = -\ .22739\ F$ | $S_3 = .11686\ F$ |
| | F = 100 | | | |
*Fig. 4*
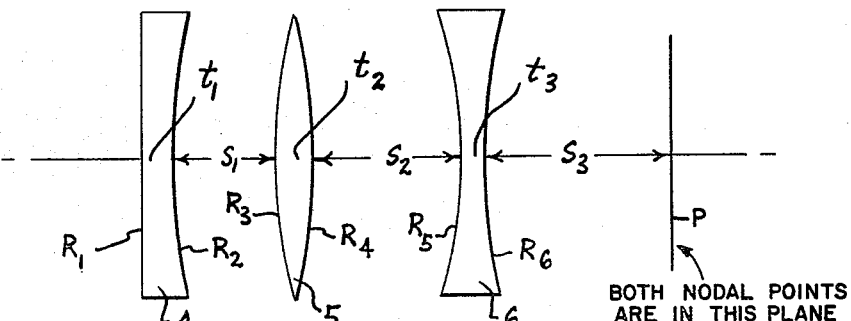
*Fig. 5*
| LENS | N | V | RADII | THICKNESSES |
|---|---|---|---|---|
| 4 | 1.517 | 64.5 | $R_1 = \infty$ | $t_1 = -.01781\ F$ |
| | | | $R_2 = -\ .48465\ F$ | $S_1 = -.06463\ F$ |
| 5 | 1.6109 | 57.2 | $R_3 = -\ .35441\ F$ | $t_2 = -.02334\ F$ |
| | | | $R_4 = +\ .61098\ F$ | $S_2 = -.09643\ F$ |
| 6 | 1.5795 | 41.0 | $R_5 = +\ .31090\ F$ | $t_3 = -.01630\ F$ |
| | | | $R_6 = -\ .42750\ F$ | $S_3 = -.12107\ F$ |
| | F = -100 | | | |
*Fig. 6*
INVENTOR
ROBERT M. MULLER
BY
Herbert C. Kimball
ATTORNEY

# United States Patent Office 2,961,924
Patented Nov. 29, 1960

2,961,924

LENS TESTING INSTRUMENT

Robert M. Muller, Cheektowaga, N.Y., assignor to American Optical Company, Southbridge, Mass., a voluntary association of Massachusetts Filed Apr. 23, 1957, Ser. No. 654,484

3 Claims. (Cl. 88—56)

This invention relates to instruments for determining the focal power of lenses, and more particularly to instruments whose optical systems conform to the principles set forth in the Troppman Patent 1,083,309. These principles require that the lens to be tested be held in the plane of the principal focus of the projecting lens, as with such an optical system, the motion of the target can indicate focal power on a linear scale. That is to say, the required movement of the target for focusing its image in the eyepiece is proportional to the focal powers of the lenses interposed for movement.

Should a comparatively high power lens (either a plus or a minus lens) be interposed for measurement, it may be found to be beyond the scope of the scale. Yet it may be desirable to test such comparatively high power lenses without rebuilding the instrument nor increasing the range of the scale. An object of the present invention is to permit such a lens testing instrument to be modified by the introduction of a supplementary lens into the optical system, and to extend the range of lenses which can be tested without changing the scale or otherwise modifying the instrument. For making determinations of the focal power of comparatively high power plus lenses a negative supplementary lens will be introduced, and in measuring comparatively high power negative lenses a positive supplementary lens will be introduced. I have determined that such a supplementary lens should be introduced between the projecting lens and the principal focus of the latter, and that the supplementary lens should be so designed that both the nodal points (sometimes called points of unit magnification) of the supplementary lens are in the same plane, and likewise that the supplementary lens should be so located that this common plane of its nodal points coincides with the principal focus of the projecting lens, i.e. the plane in which the lens to be tested is held. When the supplementary lens as thus correlated with the optical system of the instrument is introduced, accurate readings may be made from the instrument scale by adding or subtracting the value (plus or minus as the case may be) of the supplementary lens. No adjustment of the scale is needed, and no change in the position of the test lens is required. For example, the supplementary lens may be a negative lens of —10 diopters and is so placed that its nodal points are coincident with the plane in which the lens to be tested is held. In such case the scale will read 7 diopters when a +17 diopters lens is measured. Furthermore, the effective focal power of the supplementary lens may be plus 5 diopters, and in this case a —12 diopters lens being tested gives a reading of —7 diopters on the scale.

No adjustment of the scale is required when, with the supplementary lens inserted, the two points of unit magnification of the latter are coincident with the principal focus of the projecting lens. In explanation of this, the supplementary lens does not have the true effective power for which it is designed unless its first unit point is at the principal focus of the projecting lens. An accurate reading with the scale of the supplementary lens and test lens combined is only possible when the test lens is located at the second unit point of the supplementary lens. If the second unit point of the supplementary lens does not lie in the same plane with the first unit point, the instrument does not give a correct reading with the test lens placed at its usual location on the instrument.

In the drawings which illustrate my invention,

Fig. 3 is detail sectional view showing a positive form of supplementary lens for insertion in the optical system of Fig. 2;

Figure 2:
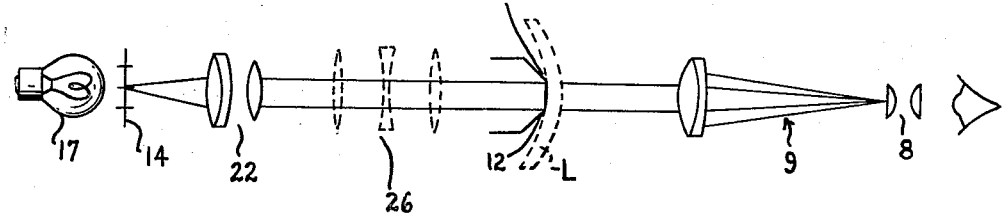
Fig. 2 is a diagrammatic view showing the optical system of the instrument with the supplementary lens inserted therein in accordance with my invention.

Fig. 4 gives constructional data for the optical system of Fig. 3;

Fig. 5 is a detail view similar to Fig. 3 showing a negative form of supplementary lens for insertion in the optical system of Fig. 2;

Fig. 6 gives constructional data for the optical system of Fig. 5.

Figure 1:
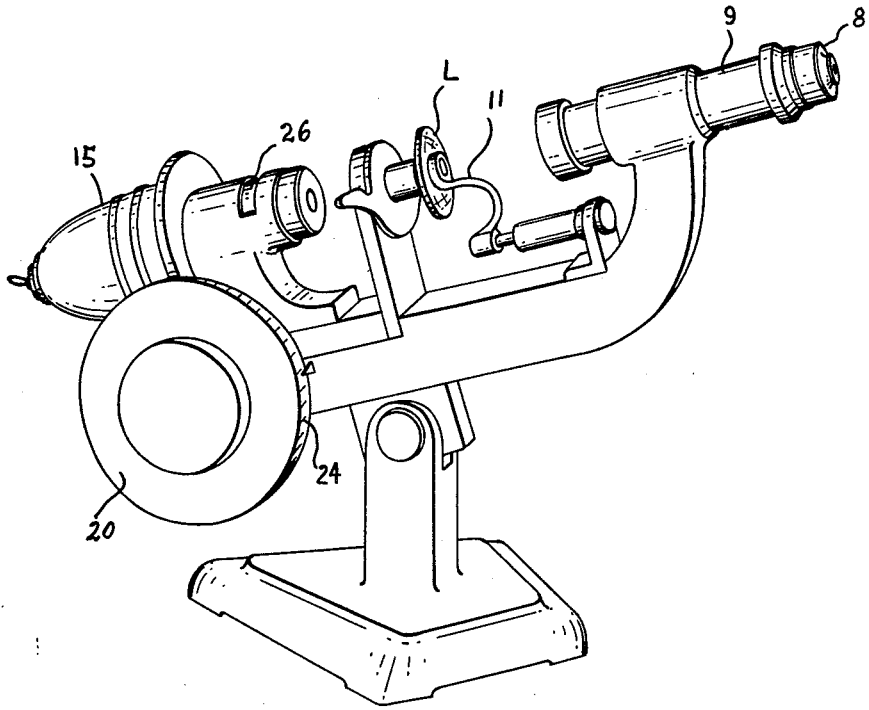
Fig. 1 is a side view of the type of lens testing instrument to which my invention relates.

Referring to Fig. 1 of the drawings, the operator looks through the eyepiece 8 of the telescope 9 to determine the focal power of a test lens L held against a lens positioning means such as the nosepiece 12 by the lens holder 11. A target 14 (see the diagrammatic view, Fig. 2) which is within the housing 15 and which is illuminated by the lamp 17 (Fig. 2), is brought into sharp focus by operation of the power wheel 20.

As is apparent from Fig. 2, which illustrates the optical system of the instrument, an image of the target 14 is projected by the standard lens 22 to an infinite distance, or in other words the light rays projected through the nosepiece 12 are parallel, if there is no test lens held against the nosepiece, and under such conditions the scale 24 of the power wheel 20 should give a reading of zero. Should a lens to be measured be positioned against the nosepiece 12, the power wheel 20 must be operated to restore parallel light entering the telescope 9. From the operator's point of view, this means that the sharp image of the target seen through the eyepiece 8 is lost when the lens to be tested is introduced in the optical system: therefore, the target 14 must be shifted until the combined effect of the standard lens 22 and of the lens being tested is to cause parallel light to again enter the telescope 9, thereby restoring the shap image of the target. The optical system as taught by Patent 1,083,309 has the advantage that the focal power of the lens under test is indicated on a linear scale.

Adding a supplementary lens in accordance with the present invention causes scale 24 on power wheel 20 to read other than zero when no test lens is positioned against the nosepiece 12. Referring to Figs. 1 and 2 the supplementary lens in the form of a triplet may be inserted at 26 between the lens 22 and the nosepiece 12. In order that this supplementary lens shall neither throw off the accuracy of the scale 24, nor force a shifting of the nosepiece 12, two requirements of optical relations must be satisfied. First, the two nodal points, i.e. the two points of unit magnification of the supplementary lens must be in the same plane. Second, the supplementary lens must be so inserted in the optical system of the instrument that this common plane is also the principal focus of the lens 22. Assuming that the effective focal power of the supplementary lens is plus ten diopters, the power wheel 20 with the scale 24 set at +10 will give a sharp focus of the target 14, and if a test lens is now positioned against the nosepiece 12 and the target 14 brought into sharp focus, the reading on the scale 24 of the power wheel 20 will be ten diopters higher than the actual power of the test lens.

In Figs. 3 and 4 a suitable design of positive supplementary lens is illustrated. This lens is made up of an intermediate negative element between two positive elements. In addition to the spacing between elements, the spacing from the principal focus P of the lens 22 is also given. The triplet is so designed that its points of unit magnification coincide with the principal focus P of this standard lens.

Figure 4 gives constructional data for this design of supplementary lens, and this table of data is repeated below:

| Lens | N | V | Radii | Thicknesses |
|---|---|---|---|---|
| 1 | 1.7506 | 27.7 | $R_1=+.5816\ F$ | $t_1=.01108\ F$ |
|   |        |      | $R_2=-1.73609\ F$ | $S_1=.09144\ F$ |
| 2 | 1.7506 | 27.7 | $R_3=-.33223\ F$ | $t_2=.01134\ F$ |
|   |        |      | $R_4=+.22783\ F$ | $S_2=.08966\ F$ |
| 3 | 1.5704 | 48.1 | $R_5=+.56001\ F$ | $t_3=.01693\ F$ |
|   |        |      | $R_6=-.22739\ F$ | $S_3=.11686\ F$ |

In this table the lens elements are numbered from front to rear in the first column, the corresponding refractive indices N for the D line of the spectrum and the dispersive index V are given in the second and third columns. In the fourth column the radii of curvatures R are given, and in the last column are given the thicknesses $t$ of lens elements and the spacings S.

In this design both nodal points lie in a plane P at a distance .11686 F from the rear element, and when the supplementary lens is mounted in the instrument these nodal points should coincide with the plane of the nosepiece 12. The particular triplet here disclosed has a plus focal power of ten diopters when F is selected to be 100 mm., which will give a reading of zero on the power wheel if a negative lens of ten diopters is being tested, and will give corresponding readings for other negative lenses being tested.

In Figs. 5 and 6 a suitable design of negative supplementary lens is illustrated. Here the intermediate element is positive and the other elements are negative. The spacing from the principal focus P of the lens 22 is substantially the same as in the case of the positive supplementary lens illustrated in Figs. 3 and 4, because they are both to be mounted in the same way in the instrument shown in the drawings. In accordance with the present invention, this negative triplet is so designed that its points of unit magnification coincide with the principal focus P of the standard lens 22.

Figure 6 gives constructional data for this design of negative supplementary lens, and this table of data is repeated below:

| Lens | N | V | Radii | Thicknesses |
|---|---|---|---|---|
| 4 | 1.517 | 64.5 | $R_1=\infty$ | $t_1=-.01781\ F$ |
|   |       |      | $R_2=-.48465\ F$ | $S_1=-.06463\ F$ |
| 5 | 1.6109 | 57.2 | $R_3=-.35141\ F$ | $t_2=-.02334\ F$ |
|   |        |      | $R_4=+.61098\ F$ | $S_2=-.09643\ F$ |
| 6 | 1.5795 | 41.0 | $R_5=+.31090\ F$ | $t_3=-.01630\ F$ |
|   |        |      | $R_6=-.42750\ F$ | $S_3=-.12107\ F$ |

In this table the lens elements are numbered from front to rear in the first column, the corresponding refractive indices N for the D line of the spectrum and the dispersive index V are given in the second and third columns. In the fourth column the radii of curvatures R are given, and in the last column are given the thicknesses $t$ of lens elements and the spacings S, it being understood that F is a negative quantity.

In this design both nodal points are in a plane P spaced $-.12107\ F$ from the rear element, and when the supplementary lens is mounted in the instrument the plane of these nodal points coincides with the plane of the nosepiece 12. The particular triplet here disclosed has a minus focal power of ten diopters when F is selected to be −100 mm.

If the instrument is called upon to assess a positive lens of relatively high focal power, the supplementary lens of Figs. 5 and 6 is inserted at 26 in the instrument. To the reading as determined by the power wheel 20 and its index 24 must be added ten diopters. If on the other hand the instrument is called upon to assess a negative lens of relatively high focal power, the supplementary lens of Figs. 3 and 4 is inserted at 26 in the instrument. In such case ten diopters must be subtracted from the reading obtained from the index 24 of power wheel 20. It will be apparent that by the use of these supplementary lenses the range of the instrument's usefulness may be extended both for positive and for negative lenses. At the same time by designing the supplementary lenses so that the points of unit magnification are in a plane which coincides with the principal focus of the standard lens 22, assurance is given that such addition or subtraction is accurate and that the reliability of the instrument is not deteriorated.

I claim:

1. In an instrument for determining the focal power of lenses, the combination with a standard projecting lens, a movable target, means for moving said target toward and away from said projecting lens, a linear scale for determining the extent of movement of said target, means for positioning the lens to be tested at the principal focus of said standard lens, and a telescope aligned with said projecting lens and target for viewing the image of the target as projected by said standard lens, of a supplementary lens and means for mounting said supplementary lens between said lens positioning means and said standard lens, said supplementary lens having nodal points lying in a common plane with said common plane coinciding with the principal focus of said standard lens when the supplementary lens is inserted in the instrument, said standard lens both when used alone and when used in combination with said supplementary lens projecting through the lens to be tested, an image of said target to be viewed by said telescope and said linear scale cooperating with said movable target to indicate focal power of a test lens in one range when said supplementary lens is not inserted and to indicate focal power of a test lens in a different range when said supplementary lens is inserted.

2. In an instrument for determining the focal power of lenses, the combination with a standard projecting lens, a movable target, means for moving said target toward and way from said projecting lens, a linear scale for determining the extent of movement of said target, means for positioning the lens to be tested at the principal focus of said standard lens, and a telescope aligned with said projecting lens and movable target for viewing the projected image of the target as brought into focus by movement of the target to compensate for a test lens at the principal focus of said projecting lens, of a supplementary lens and means for mounting said supplementary lens between said lens positioning means and said standard lens, said supplementary lens having nodal points lying in a common plane with said common plane coinciding with the principal focus of said standard lens when the supplementary lens is inserted in the instrument, said standard lens of itself being adapted to project through the lens to be tested, an image of said target for viewing by said telescope and said standard lens in combination with said supplementary lens being adapted to project through the lens to be tested, an image of said target for viewing by said telescope, and said linear scale cooperating with said movable target to indicate focal power of a test lens in one range when said supplementary lens is not inserted and to indicate focal power of a test lens in a different range when said supplementary lens is inserted.

3. In an instrument for determining the focal power of lenses, the combination with a standard projecting lens, a movable target, means for moving said target toward and away from said projecting lens, a linear scale for determining the extent of movement of said target, means for positioning the lens to be tested at the principal focus of said standard lens, a telescope aligned with said projecting lens and movable target for viewing the projected image of the target and means for simultaneously shifting said linear scale and said target to effect sharp focusing of the image of said target in said telescope upon positioning of the lens to be tested at said principal focus, of a supplementary lens and means for mounting said supplementary lens between said lens positioning means and said standard lens, said supplementary lens extending the range of the instrument and having nodal points lying in a common plane with said common plane coinciding with the principal focus of said standard lens when the supplementary lens is inserted in the instrument, both said standard lens of itself and said standard lens in combination with said supplementary lens being adapted to project through the lens to be tested an image of said target for viewing by said telescope, and said linear scale cooperating with said movable target to indicate focal power of a test lens in one range when said supplementary lens is not inserted and to indicate focal power of a test lens in a different range when said supplementary lens is inserted.

References Cited in the file of this patent

UNITED STATES PATENTS

| | | |
|---|---|---|
| 585,390 | Lloyd | June 29, 1897 |
| 1,383,678 | Tillyer et al. | July 5, 1921 |
| 2,107,553 | Tillyer | Feb. 8, 1938 |
| 2,191,107 | Glancy | Feb. 20, 1940 |
| 2,496,069 | Sachtleben | Jan. 31, 1950 |
| 2,624,237 | Davis | Jan. 6, 1953 |

FOREIGN PATENTS

| | | |
|---|---|---|
| 907,358 | Germany | Mar. 25, 1954 |

OTHER REFERENCES

"The Lens" (Bolas), published by Dawbarn and Ward, Ltd. (London), 1902, page 20 relied on.